June 10, 1947.  R. H. MUSTONEN  2,422,034
GAUGING DEVICE FOR DETERMINING DIMENSIONS OF ROTARY MEMBERS OF PUMPS
Filed Dec. 1, 1943  3 Sheets-Sheet 2

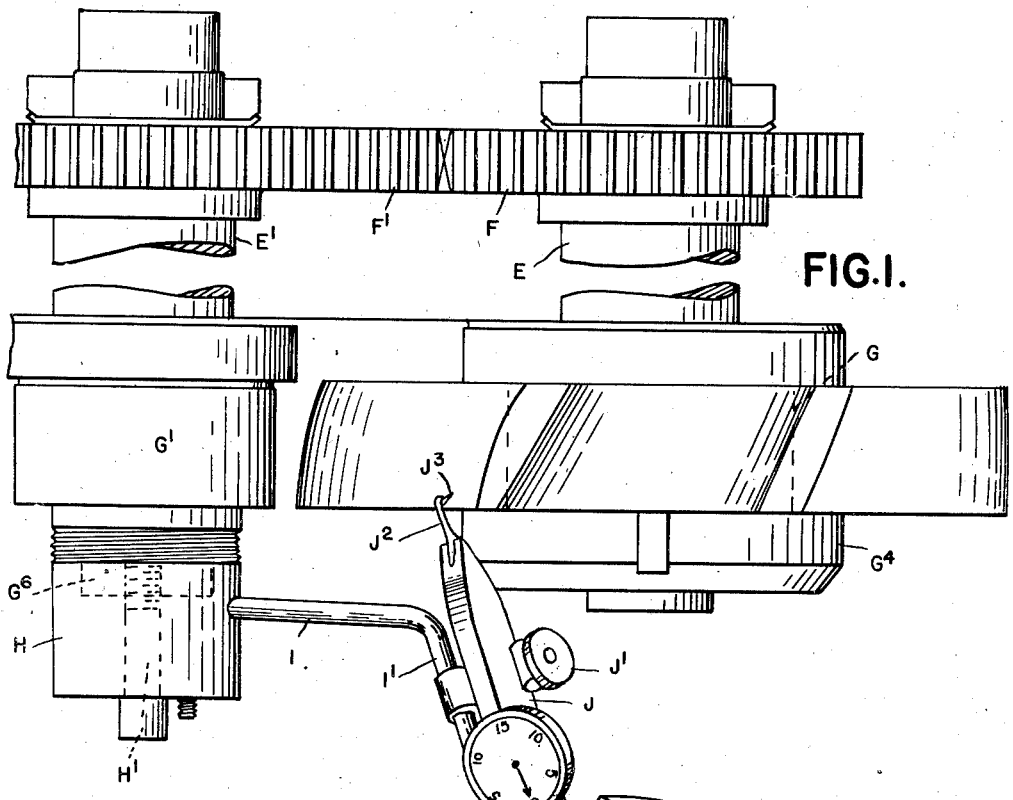
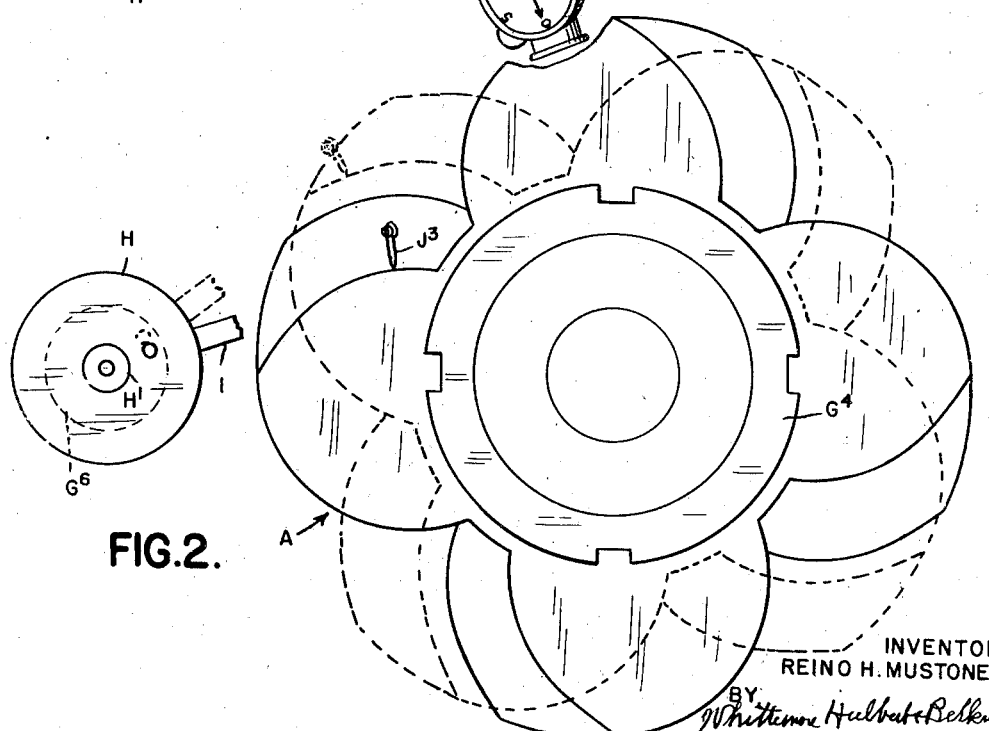

INVENTOR.
REINO H. MUSTONEN
BY
Whittemore Hulbert & Belknap
ATTORNEYS

June 10, 1947.    R. H. MUSTONEN    2,422,034
GAUGING DEVICE FOR DETERMINING DIMENSIONS OF ROTARY MEMBERS OF PUMPS
Filed Dec. 1, 1943    3 Sheets-Sheet 3

INVENTOR.
REINO H. MUSTONEN
BY
*Whittemore Hulbut + Belknap*
ATTORNEYS

Patented June 10, 1947

2,422,034

UNITED STATES PATENT OFFICE 2,422,034

GAUGING DEVICE FOR DETERMINING DIMENSIONS OF ROTARY MEMBERS OF PUMPS

Reino H. Mustonen, Detroit, Mich., assignor to The Gear Grinding Machine Company, Hamtramck, Mich., a corporation of Michigan Application December 1, 1943, Serial No. 512,508

1 Claim. (Cl. 33—174)

The invention relates to the manufacture by machining, grinding or any other process of conjugate members where a high degree of accuracy in the cooperating curved surfaces is essential.

It is the object of the invention to provide means for checking the accuracy of these surfaces and for measuring any deviation from true form. While the invention is adapted for use in checking various curves, I shall specifically describe its application to the checking of cycloidal and arcuate curves in conjugate rotary members for a compressor pump.

The specific construction just referred to is of the general type of gear pumps but, instead of having like intermeshing gear members of involute tooth contour, it is composed of male and female members having combined arcuate and cycloidal curves in the cross sectional contours thereof. Also the inner engaging surfaces of these members are helicoidal and are preferably fashioned by form grinding. Due to wear of the formed surface of the grinder wheel or possibly to wear in the diamond of the trimming mechanism for the grinder wheel, the curved surface of the work may be inaccurate. It is, therefore, the object of the invention to provide means for quickly checking the accuracy of the curve.

Generally described, my improved apparatus comprises mechanism for generating the true curve, a gauge carried by said mechanism and having its actuating member located to extend transversely of the generating point in said mechanism, and means for mounting the work to arrange the surface to be tested in coincidence with the path of the generating point. The actuating member of the gauge thus bears on this surface and any inaccuracy of the latter will actuate the gauge to measure the amount of deviation from true form. The method involved is to move a gauge by a curve generating mechanism so located that the actuating member of said gauge is at the generating point and travels over the surface to be tested.

In the drawings:

Fig. 1 is a plan view partly broken away of the testing mechanism;

Fig. 2 is a front elevation thereof as arranged for testing the cycloidal curve of the male member;

Figure 4:
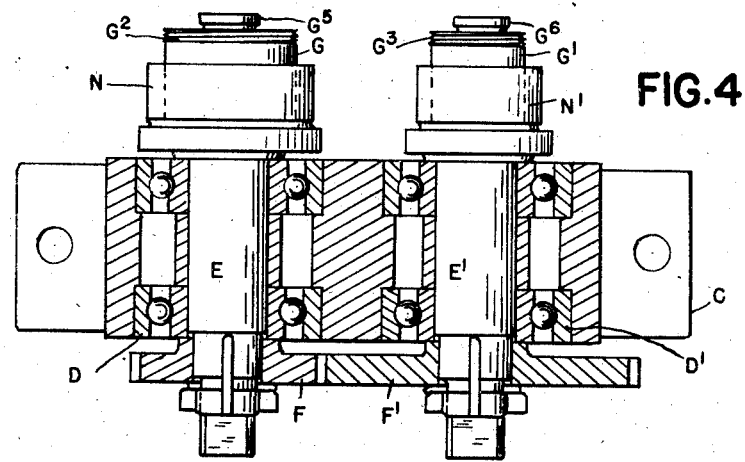
Fig. 4 is a horizontal section.
Figure 3:
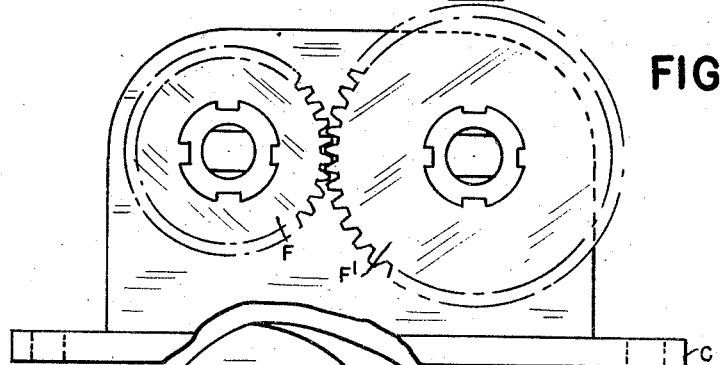
Fig. 3 is a rear elevation.
Figure 6:
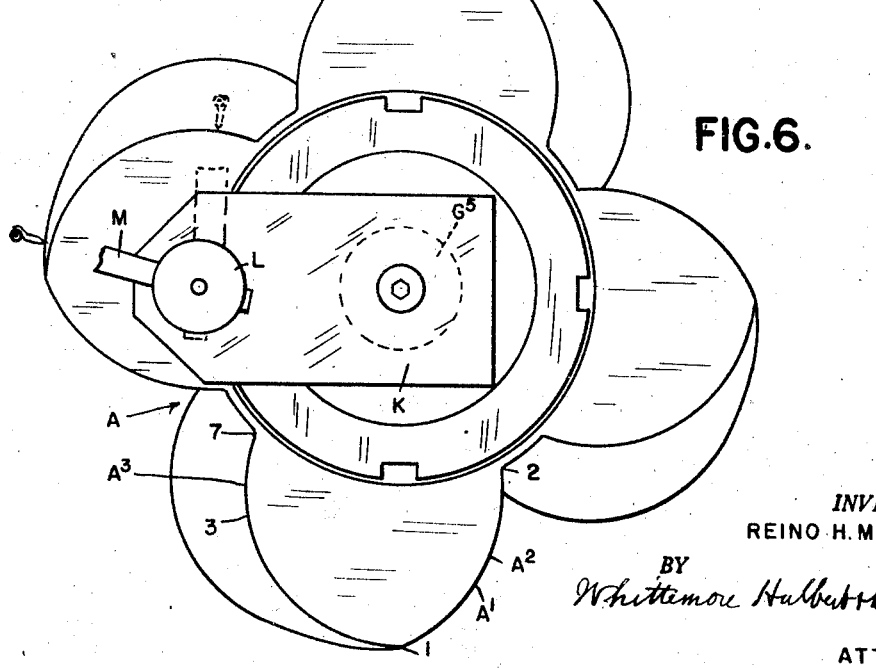
Fig. 6 is a front elevation showing the parts arranged for testing the arcuate or radius curve of the male member.

With the construction as illustrated in Figs. 1 to 7, the mechanism is designed to generate cycloidal and arcuate curves and is used for testing the curved surfaces of the male and female members of a compressor pump. The male member A is formed with a series of teeth A' each having on one side thereof a cycloidal contour $A^2$ between the points 1 and 2. On the opposite side of each tooth is a contour $A^3$ which is arcuate between the points 1 and 3 and a tangent cycloid between the points 3 and 7. The female member B has a series of recesses B', the contour $B^2$ on one side of each recess extending between the points 4 and 5 being a cycloidal curve and the contour $B^3$ on the opposite side of the recess between the points 6 and 5 being an arcuate or radius curve.

The mechanism comprises a base C on which is mounted bearings D and D' for a pair of parallel shafts E and E'. These shafts are rotatably connected to each other through the medium of change gears F and F' which may be selected to correspond to the pitch circles respectively of the male and female members A and B. On the opposite ends of the shafts E and E' are enlarged cylindrical portions G and G' of respective diameters to fit the bores of the members A and B. Beyond these portions G and G' are threaded portions $G^2$ and $G^3$ for receiving nuts or collars $G^4$ for clamping the work on the shaft. Beyond the threaded portions $G^2$ and $G^3$ are smaller diameter portions $G^5$ and $G^6$ for receiving gauge holding members as hereinafter described.

For testing the cycloidal curve $A^2$ of the male member A, the device is arranged as illustrated in Fig. 1. Here a member H is mounted on the extension $G^6$ of the shaft E' being secured thereto by a clamping screw H' at the end thereof. The member H has a radially extending bore therein for adjustably receiving an arm I. This arm has a bent portion I' on which is mounted the gauge J being secured thereto by a clamp J'. The actuating member $J^2$ of the gauge is positioned with its contacting point $J^3$ at an exact distance from the axis of the shaft E', this being the same as the radius of the pitch circle of the gear F'. Consequently, when the gears F and F' are rotated in mesh with each other, the point $J^3$ will trace a cycloidal curve, the origin of which is in a base circle corresponding in radius to the pitch circle of the gear F. The movement of the point J³ to operate the actuating member J² of the gauge is transverse to the line traced by said point during the movement of the gears F and F'. Consequently, if said point were to travel over and in contact with a surface not exactly corresponding to said curve, any deviation would be indicated and measured by said gauge. The male member A is mounted on the cylindrical portion G of the shaft E and is clamped in any position of rotary adjustment thereon by the collar G⁴. This permits of setting the member A with any one of the cycloidal surfaces A² thereof in contact with the point J³ after which the collar G⁴ is clamped and the gears F and F' are rotated. This will cause the point to travel over and in contact with the surface and as before described, if there is any deviation in this surface from the true cycloidal curve, the gauge will be operated to indicate the amount of such deviation.

For checking the cycloidal surface B² of the female member B, the operation is substantially the same but instead of mounting the member B on the cylindrical portion G of the shaft E, it is mounted on the cylindrical portion G' of the shaft E'. Also the gauge J is carried by a member K clamped upon the portion G⁵ of the shaft E. This member K has a head L mounted thereon to be rotatable about an axis parallel to and spaced from the axis of the shaft E' by a dimension equal to the radius of the pitch circle of the gear F. In the position shown in Fig. 7, the axis of the head L intersects the base circle about the shaft E' from which the curve is generated. The gauge is mounted on an arm M which is radially adjustable in a socket in the head L and the arrangement is similar to that previously described permitting the setting of the point J³ of the gauge an exact radial distance from the axis of the shaft E. Thus, when the parts are properly adjusted and the gears are rotated, the point J³ will move over the surface B² and any deviation of that surface from the true curve will be indicated on the gauge.

For checking the arcuate curve A³ of the member A, said member is mounted as previously described on the cylindrical portion G of the shaft E and the member K is also mounted on the portion G⁵ of said shaft. This will bring the axis of the head L to intersect the base circle of the member A. Said member A is then adjusted about the axis of the shaft to bring an arcuate surface A³ thereof into contact with the point J³ of the gauge after which the head L is rotated. If the surface A³ is true, the point J³ will follow along the same without movement of the index of the gauge. On the other hand, if the surface is not true, the amount of deviation from the true curve will be indicated on the gauge.

Figure 5:
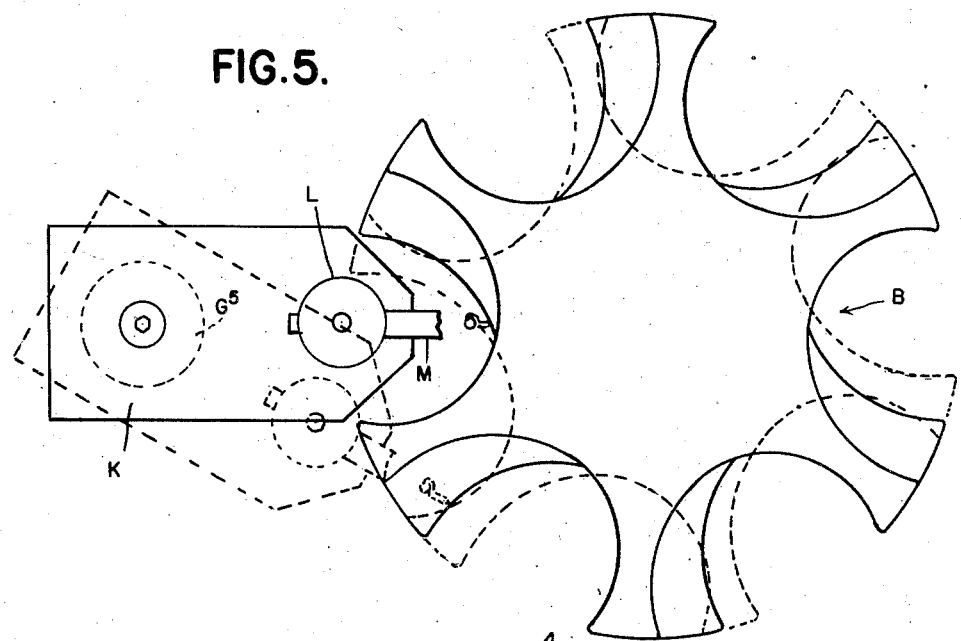
Fig. 5 is a view similar to Fig. 2 with the parts arranged for testing the cycloidal curve of the female member.
Figure 7:
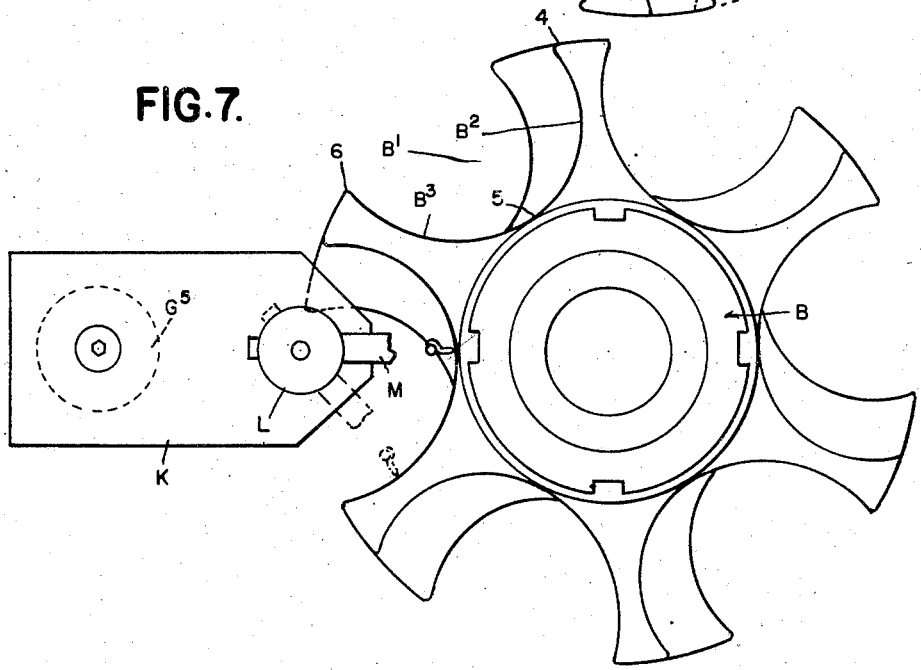
Fig. 7 is a similar view with the parts arranged for testing the arcuate or radius curve of the female member.

For checking the arcuate surface B³ of the female member B, the parts are arranged as shown in Fig. 5 and Fig. 7 and, after adjustment of the member B so as to contact a surface B³ thereof with the point J³, the head L is rotated.

This would indicate any deviation from true form on the gauge J.

In performing the several checking operations as above described, it is absolutely essential that the gauge actuating member should be located at an exact radial distance from the axis of the shaft on which it is mounted. To facilitate such setting I have provided two sleeves such as N and N' which may be mounted in place of the work respectively on the portion G of the shaft E and G' on shaft E'. The outer surfaces of these sleeves are of the same radii as that for the proper setting of the point J³ of the gauge actuating member. Therefore, it is only necessary to contact the point with the surface to secure the proper setting.

In the checking of curves as thus far explained, no reference has been made to the helicoidal form of the surfaces. However, as the curves tested are the cross sectional contours in the place of rotation of the member, what is true in one plane is generally true in any parallel plane.

While I have only described the apparatus as constructed for testing cycloidal and arcuate curves, it is obvious that the same principle may be applied to the testing of curves of any form. All that is required is a suitable mechanism for generating the particular curve associated with a gauge mounted on said mechanism and a holder for the work in operative relation thereto, the organization being generally the same as previously described.

What I claim as my invention is:

An apparatus for checking the accuracy of helicoidal surfaces of conjugate rotary helicoidal members comprising a pair of parallelly mounted shafts having the axes thereof spaced to correspond to that of the axes of said conjugate helicoidal members, gearing connecting said shafts to rotate in the same ratio as that of the members to be tested, each of said shafts being provided with a mounting portion for one of the conjugate members and which also serves as a mounting for testing mechanism, testing mechanism including a radially adjustable arm, a gauge mounted on said arm, and a pointed actuating member for said gauge whereby said gauge may be adjusted to a position where the point of the actuating member thereof will during the rotation of said shafts generate the true contour of the surface to be tested and any deviation of the actual surface from said true surface will be indicated by the gauge.

REINO H. MUSTONEN.

REFERENCES CITED

The following references are of record in the file of this patent:

UNITED STATES PATENTS

| Number | Name | Date |
|---|---|---|
| 2,057,970 | Pelphrey | Oct. 20, 1936 |
| 1,663,085 | Logne | Mar. 20, 1928 |
| 1,619,483 | Olson | Mar. 1, 1927 |